(No Model.)
H. TIRMANN.
STATIC ELECTRICAL MACHINE.
No. 423,708. Patented Mar. 18, 1890.
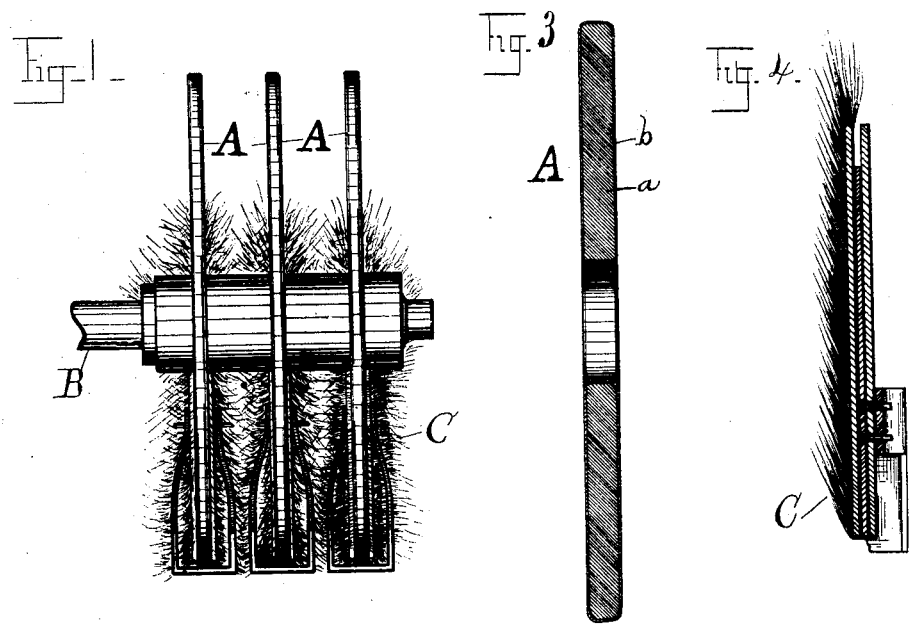
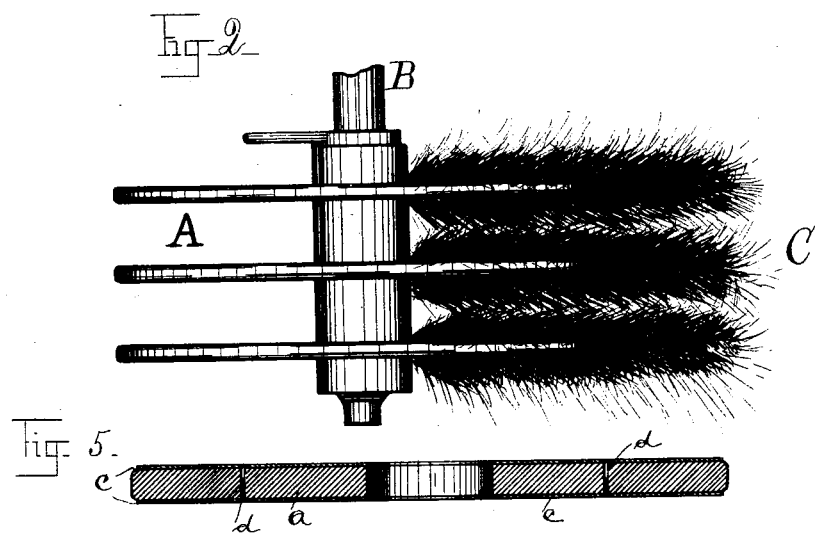
WITNESSES:
N. H. Fay
C. B. Nash.
INVENTOR
Hugo Tirmann

UNITED STATES PATENT OFFICE.

HUGO TIRMANN, OF CLEVELAND, OHIO, ASSIGNOR TO THE UNITED STATES MINE SUPPLIES COMPANY.

STATIC ELECTRICAL MACHINE.

SPECIFICATION forming part of Letters Patent No. 423,708, dated March 18, 1890.

Application filed June 18, 1888. Serial No. 277,458. (No model.)

*To all whom it may concern:*

Be it known that I, HUGO TIRMANN, a citizen of Austria, having declared my intention of becoming a citizen of the United States of America, a resident of Cleveland, county of Cuyahoga, and State of Ohio, have invented certain new and useful Improvements in Static Electrical Machines, of which the following is a specification, the principle of the invention being herein explained and the best mode in which I have contemplated applying that principle, so as to distinguish it from other inventions.

The controlling object of this invention is the construction of frictional electric machines in which electricity is produced by the continued friction of one substance against another, so that said machines, other conditions being equal, will be productive of a greater quantity of electricity than before. To this end I construct a frictional electric machine in which the electricity-generating parts of the machine consist of a compound electric plate or cylinder to be excited by an exciter or rubber made of animal fur.

Inasmuch as the invention thus relates in detail to a member of a frictional machine—a compound electric—irrespective of the construction of the remaining members thereof, the drawings represent only the electricity-generating parts of such a machine.

Figure 1 is a front elevation of a series of electrics mounted on a common rotary shaft and their corresponding rubbers or exciters as in operative combination. Fig. 2 is a plan view of the same. Fig. 3 is a transverse diametrical section of one of the electrics. Fig. 4 is a transverse longitudinal section of one of the rubbers or exciters. Fig. 5 is a diametrical section of a modified form of my electric.

A series of compound electrics A are suitably mounted on a rotary shaft B, while suitably located in reference to said compound electrics are the corresponding rubbers or exciters C. The rotation of the shaft B carries the compound electrics with it in common rotary movement, while the respective rubbers or exciters are maintained stationary in proper position relative to their corresponding compound electrics by any suitable means.

The invention relates to what I term "compound electrics" for use in frictional machines, and I will now proceed to explain its object. If I take a frictional machine with an electric of hard rubber or glass, as made heretofore, and with a certain output, and I apply to this electric a coating of a mixture to be specified hereinafter and in a certain manner, I obtain with this machine vastly superior results as to quantity of electricity generated. A compound electric I therefore term one which consists of more than one electricity-generating non-conducting substance, which different substances, when brought to use in a frictional machine in the manner described, give a larger output of electricity than the different substances in aggregate when used in separate machines.

In coating, sheeting, or partially covering electrics of frictional machines for the purpose above mentioned, I employ a mixture having parts and proportions consisting of two ounces of gun-cotton dissolved in a mixture of nine ounces of ether and one ounce of alcohol. The exciters C are made of animal fur, such fur exciter, by reason of its peculiar character, operating to best advantage as an exciter in combination with such coated compound electrics, generating electricity in large quantity without unduly wearing the electrics and dispensing entirely with the amalgamation and often-repeated reamalgamation of the rubbers or exciters in use at present.

In further description of my compound electric I may speak of the hard-rubber disk $a$ as the first electric and of the envelope $b$ as the second electric, said two electrics combining together to constitute my compound electric. The second electric $b$—that is, the casing, envelope, partial coating, or sheeting of the first electric $a$—is formed by applying successive coatings of the described preparation thereon until the desired thickness has been reached. The rubber disk is the mechanically stronger part of the compound electric. For hard rubber wherever it is mentioned in this specification glass could be substituted or any other suitable electric or non-conducting material.

The several compound electrics represented in the drawings as mounted on the common rotary shaft B are relatively parallel and adjacent, such specific construction enabling the machine to be comprised in much smaller dimensions than otherwise would be possible and at the same time be productive of the great amount of electricity desired.

Fig. 4 represents the detail construction of the form of rubber or exciter used by me; but inasmuch as the same does not constitute any part of this invention the detail construction of such rubber or exciter is not herein further dwelt upon and may be of any suitable character.

In Fig. 5 is shown a modified form of compound electric, consisting of interior body $a$ and two opposite face-plates $c$, secured in position by rivets $d$. In substitution for such rivets said face-plates may be cemented or otherwise secured to the primary body, said primary body being of a mechanically stronger and more durable non-conducting material than the said face-plates, while the latter are formed of non-conducting material of higher electric excitability or capacity relatively to glass or fur than the said primary body, although they may be mechanically weaker or less durable.

I claim—

1. In a frictional electrical machine, the combination, with an animal-fur rubber, of an electric A, the latter composed of an interior body $a$ and an envelope $b$ of higher electric excitability than said interior body, substantially as set forth.

2. In a frictional electric machine, a compound electric consisting of an interior body $a$, formed of hard rubber or glass, and an exciting-coating $b$, formed of a preparation of two ounces of gun-cotton dissolved in a mixture of nine ounces of ether and one ounce of alcohol, substantially as set forth.

3. In a frictional electric machine, the compound electric A, consisting of interior body $a$ and an envelope, said envelope being of higher electric excitability than said interior body, substantially as set forth.

4. In a frictional electric machine, the combination of two compound electrics located relatively parallel and adjacent to each other, each said compound electric consisting of an interior body $a$, of hard rubber or of glass, and an excitant envelope formed of a preparation of two ounces of gun-cotton dissolved in a mixture of nine ounces of ether and one ounce of alcohol, said compound electrics being mounted in common on a rotary shaft B, substantially as set forth.

In testimony that I claim the foregoing to be my invention I have hereunto set my hand this 15th day of June, A. D. 1888.

HUGO TIRMANN.

Witnesses:
J. B. FAY,
E. J. CLIMO.